Sept. 16, 1924.
C. F. MARSTON
1,509,049
REAR END SIGNAL FOR VEHICLES
Filed June 1, 1920
2 Sheets-Sheet 1
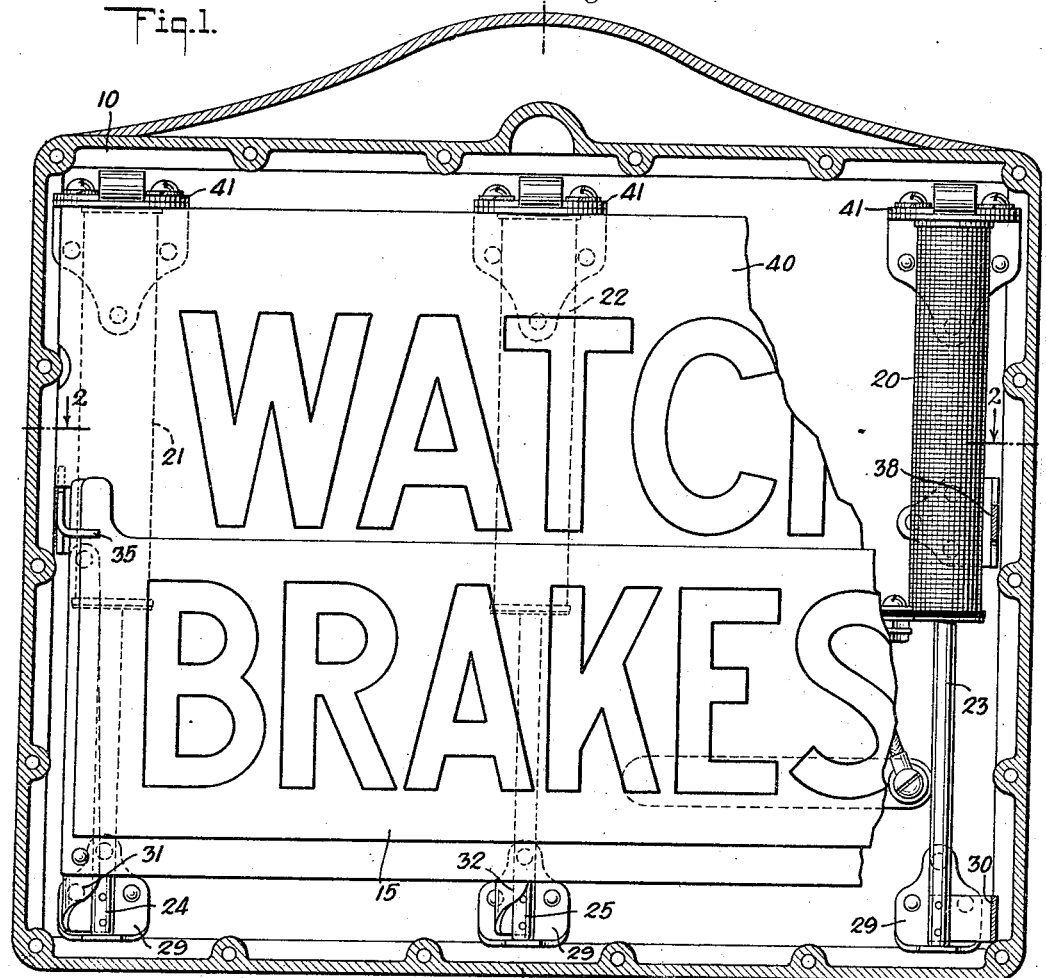
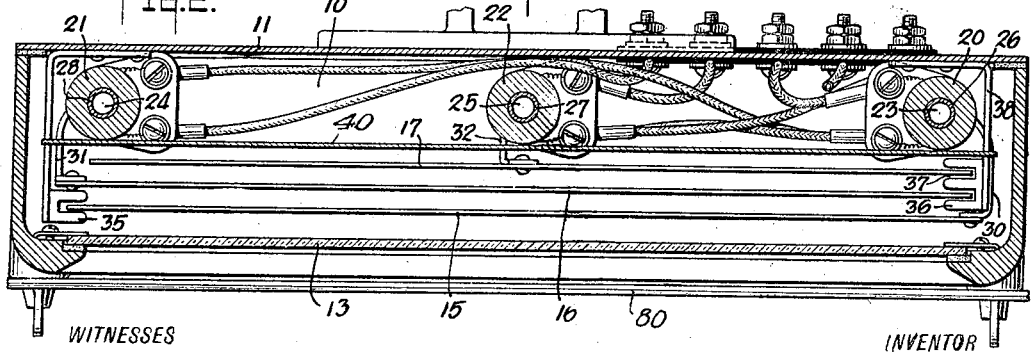
WITNESSES
INVENTOR
C. F. MARSTON
BY
ATTORNEYS Sept. 16, 1924.
C. F. MARSTON
1,509,049
REAR END SIGNAL FOR VEHICLES
Filed June 1, 1920        2 Sheets-Sheet 2
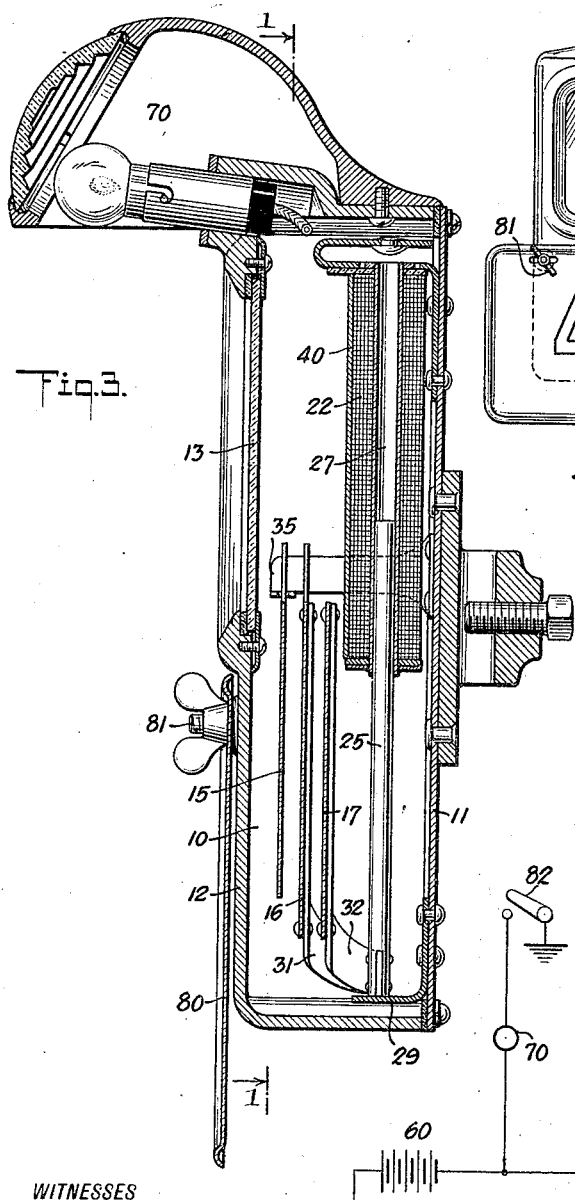
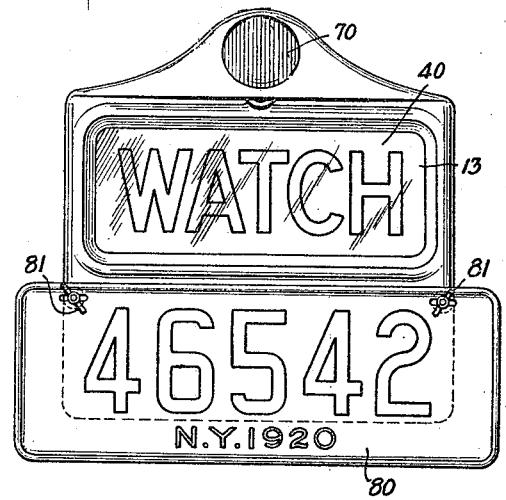
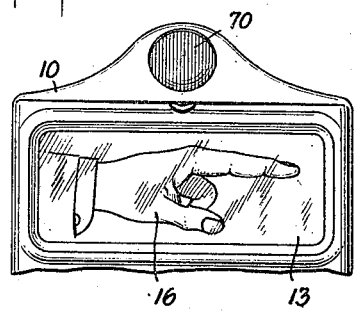
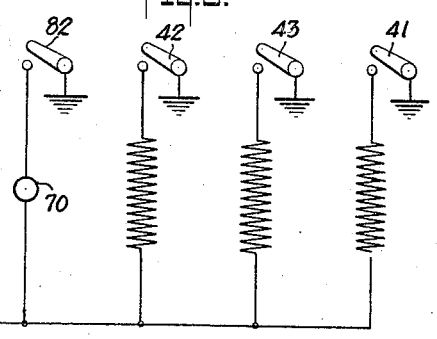
WITNESSES
INVENTOR
C. F. MARSTON
BY
ATTORNEYS Patented Sept. 16, 1924.

1,509,049

UNITED STATES PATENT OFFICE.

CHARLES F. MARSTON, OF BROOKLYN, NEW YORK, ASSIGNOR TO AUTO-AUTOMATIC SIGNAL CO., INC., A CORPORATION OF NEW YORK.

REAR-END SIGNAL FOR VEHICLES.

Application filed June 1, 1920. Serial No. 385,517.

*To all whom it may concern:*

Be it known that I, CHARLES F. MARSTON, a citizen of the United States, and a resident of the city of New York, borough of Brooklyn, in the county of Kings and State of New York, have invented a new and Improved Rear-End Signal for Vehicles, of which the following is a full, clear, and exact description.

The invention relates to rear end signals for vehicles such as shown and described in my copending application for Letters Patent of the United States, Serial No. 326,820, filed by me on September 27, 1919.

The object of the present invention is to provide a new and improved rear end signal for use on automobiles and other vehicles and arranged to attract at all times the attention of the driver of a following vehicle.

Another object is to render the actuating mechanism invisible whether a signal is in the display position or not.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional elevation of the rear end signal for vehicles on the line 1—1 of Figure 3, and with parts of the stationary and movable indicating members broken out;

Figure 2 is a sectional plan view of the same on the line 2—2 of Figure 1;

Figure 3 is a cross section of the same on the line 3—3 of Figure 1;

Figure 4 is a reduced face view of the rear end signal and license plate attached thereto;

Figure 5 is a similar view of the rear end signal with a direction indicating member in display position; and Figure 6 is a diagrammatic view of the electric circuits.

The improved rear end signal is mounted in a suitably constructed casing 10 having a removable backplate 11, and a front 12 provided in its upper portion with a diaphanous pane or display window 13 behind which are adapted to be displayed singly indicating members 15, 16, 17, preferably in the form of thin plates provided with words, arrows, pointing fingers and other indicating means to be seen by the driver of a following vehicle or by a pedestrian or other person whenever such indicating member is lifted into display position in the rear of the window 13. In practice and as shown in Figure 1, the plate 15 is provided with the word "Brakes," the plate 16 is provided with a hand pointing to the right (see Figure 5), while the plate 17 is provided with a similar hand but pointing to the left. The indicating members 15, 16 and 17 are normally in lowermost position (see Figure 3) and hence the above-mentioned indicating means are not visible through the window 13 until the corresponding indicating member is lifted or raised into uppermost position, as shown, for instance, in Figure 5, which shows the indicating member 16 raised into display position thereby indicating to a following vehicle that it is the intention to turn out to the right. When the indicating member 15 is moved into display position the word "Brakes" appears through the display window 13 thus indicating to the following vehicle that it is the intention to slow up or come to a stop. When the indicating member 17 is raised into display position it indicates to a following vehicle the intention of turning out to the left.

In order to move the indicating members 15, 16 and 17 into raised or display position use is made of solenoids 20, 21 and 22 attached to the upper portion of the backplate 11 and having their axes disposed in a vertical plane parallel to the planes of the indicating members 15, 16 and 17. The solenoids 20 and 21 are located in the rear corners of the casing 10 while the solenoid 22 is located in the rear at the middle of the casing, as plainly indicated in Figure 2. The solenoids 20, 21 and 22 are provided with cores or plungers 23, 24 and 25 mounted to slide up and down in tubular guideways 26, 27 and 28 arranged centrally in the solenoids. The lower ends of the cores 23, 24 and 25 are adapted to rest on suitable brackets 29 attached to the backplate 11 (see Figure 3).

The indicating members 15, 16 and 17 are connected by brackets 30, 31 and 32 with the lower ends of the corresponding cores 23, 24 and 25. By reference to Figure 2 it will be noticed that the bracket 30 is attached to the right-hand side of the indicating member 15 and extends rearward to connect with the core 23, the bracket 31 is atached to the left-hand side of the indicating member 16 and extends rearward and connects with the core 24, and the bracket 22 is attached to the indicating member 17 near the middle thereof and extends rearwardly to connect with the core 25. The free or left-hand end of the indicating member 15 is mounted to slide in a guideway 35 attached to the backplate 11, and the right-hand ends of the indicating members 16 and 17 are mounted to slide in guideways 36, 37 formed in a bracket 38 attached to the backplate 11. By the arrangement described the guideways 35, 36 and 37 properly hold the indicating members 15, 16 and 17 spaced apart to insure a proper up and down movement of the said members whenever the solenoids 20, 21 and 22 are alternately energized and deenergized.

In front of the solenoids 20, 21 and 22 and directly opposite the window 13 is arranged a sign 40 attached to brackets 41 carrying the solenoids, and the front face of this sign 40 is rendered attractive to the driver of a following vehicle by placing thereon suitable attractive matter such, for instance, as the word "Watch" (see Figures 1 and 4). It will be noticed that this sign 40 is visible through the window 13 as long as the indicating members 15, 16 and 17 are in lowermost non-display position, and hence the driver of a following vehicle is made conscious of the fact that something is liable to be displayed, that is, one of the signs 15, 16 or 17. It will further be noticed that the sign 40 covers the solenoids 20, 21 and 22 and hence the latter are not visible through the display window 13 at the time the indicating members 15, 16 and 17 are in lowermost position. It is understood that the sign 40 is in front of the solenoid but in the rear of the rearmost indicating member 17 and hence when an indicating member 15, 16 or 17 is moved into raised position it moves in front of the sign 40 and hides the latter for the time being.

The solenoids 20, 21 and 22 are connected with a suitable source of electrical energy 60 and the circuits are provided with switches 41, 42 and 43 under the control of the operator in charge of the vehicle to enable the said operator to close the normally open switch for any one of the solenoids with a view to energize the same and cause the corresponding indicating member 15, 16 or 17 to be lifted into display position in front of the sign 40 and opposite the window 13 thus giving the desired signal to the driver of the following vehicle. When the closed switch is opened by the operator then the corresponding solenoid 20, 21 or 22 is deenergized and hence its core 23, 24 or 25 and with it the corresponding indicating member 15, 16 or 17 drops downward into its normal position of rest.

The casing 10 is preferably provided at the top with an electric tail lamp 70 arranged to illuminate the indicating member lifted into display position during the night as well as the license plate 80 detachably mounted by suitable bolts 81 on the lower portion of the front 12 of the casing 10. A suitable switch 82 in the circuit for the lamp 70 permits of turning on the lamp or cutting it out whenever it is desired to do so.

Having thus described my invention, I claim as new and desire to secure by Letters Patent:—

1. A rear end signal for vehicles, comprising a casing having a display window, a plurality of movable indicating members normally one in the rear of another and in non-display position relative to said window, a guide for one of said members arranged at one side of said casing, an actuating element connected with said indicating member at the opposite side of said casing from said guide to move said member into display position in said window, guides for the other indicating members arranged at the side of the casing adjacent said actuating element, and other actuating elements connected with the last named indicating members at points remote from the guides therefor for moving said indicating members into display positions in said window.

2. A rear end signal for vehicles, comprising a casing having a display window, a plate detachably secured to said casing and forming the back thereof, a plurality of movable indicating members normally one in the rear of another and in non-display position relative to said window, a guide for one of said members arranged at one side of said casing, an actuating element secured to said plate and connected with said indicating member at the opposite side of said casing from said guide to move said member into display position in said window, guides for the other indicating members arranged at the side of the casing adjacent said actuating element, and other actuating elements also carried by said plate and connected with the last named indicating members at points remote from the guides therefor for moving said indicating members into display positions in said window.

3. A rear end signal for vehicles, comprising a plurality of solenoids having their axes disposed in a vertical plane, and a series of indicating members arranged one in front of the other in planes parallel to and in front of the said plane of the solenoids, and brackets each rigidly connecting the corresponding indicating member with the lower end of the movable member of the corresponding solenoid, the brackets of the outermost solenoids being attached to the opposite ends of the two outermost indicating members, and the bracket of the central solenoid being attached to the rearmost indicating member.

CHARLES F. MARSTON.